(12) United States Patent
Ghannam et al.

(10) Patent No.: US 10,491,793 B2
(45) Date of Patent: Nov. 26, 2019

(54) SHIELDED CAMERA MONITORING OF WHEELS FROM VEHICLE UNDERSIDE USING REFLECTORS

(71) Applicant: Ford Global Technologies, LLC, Dearborn, MI (US)

(72) Inventors: Mahmoud Yousef Ghannam, Canton, MI (US); Brian Bennie, Sterling Heights, MI (US); Swadad A. Carremm, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 116 days.

(21) Appl. No.: 15/491,086

(22) Filed: Apr. 19, 2017

(65) Prior Publication Data

US 2018/0309918 A1 Oct. 25, 2018

(51) Int. Cl.
| | |
|---|---|
| *H04N 5/225* | (2006.01) |
| *G03B 17/17* | (2006.01) |
| *H04N 7/18* | (2006.01) |
| *G02B 26/08* | (2006.01) |
| *G02B 27/00* | (2006.01) |

(Continued)

(52) U.S. Cl.
CPC .............. *H04N 5/2259* (2013.01); *B60R 1/00* (2013.01); *G02B 26/0816* (2013.01); *G02B 27/0006* (2013.01); *G03B 17/17* (2013.01); *H04N 5/2252* (2013.01); *H04N 5/2254* (2013.01); *H04N 7/188* (2013.01); *H04N 5/23293* (2013.01); *H04N 5/247* (2013.01)

(58) Field of Classification Search
CPC ...... H04N 5/2259; B60R 1/00; G02B 17/008; G02B 26/0816
USPC ........................................................ 348/148
See application file for complete search history.

(56) References Cited

U.S. PATENT DOCUMENTS

| | | | | |
|---|---|---|---|---|
| 4,685,779 A | * | 8/1987 | Gonzalez ............ | G02B 7/1827 359/841 |
| 5,209,559 A | * | 5/1993 | Ruppel .................... | B60Q 1/16 362/369 |

(Continued)

FOREIGN PATENT DOCUMENTS

| | | |
|---|---|---|
| CN | 104309545 B | 5/2016 |
| CN | 205573756 U | 9/2016 |

(Continued)

*Primary Examiner* — On S Mung
(74) *Attorney, Agent, or Firm* — Frank L. Lollo; MacMillan, Sobanski & Todd, LLC

(57) ABSTRACT

An imaging system attaches to a frame on an underside of a vehicle to form an enclosure with an open bottom. A fixed camera is mounted in the enclosure having a first field of view directed through the open bottom. A reflector is supported by a carrier mechanism having a linear section and a rotary section. The linear section is extendable between a retracted position which stows the reflector inside the enclosure and an extended position which deploys the reflector through the open bottom. The rotary section rotates the reflector into an alignment with the camera to provide a reflected field of view along the underside of the vehicle. A controller is coupled to the carrier mechanism for selectably deploying the reflector through the open bottom for limited periods to capture images during predetermined conditions and otherwise retracting the reflector into the enclosure for shielding from an external environment.

19 Claims, 10 Drawing Sheets

(51) Int. Cl.
  *B60R 1/00* (2006.01)
  *H04N 5/247* (2006.01)
  *H04N 5/232* (2006.01)

(56) References Cited

U.S. PATENT DOCUMENTS

| | | |
|---|---|---|
| 8,087,301 B2 | 1/2012 | Hammerschmidt et al. |
| 8,497,907 B2 | 7/2013 | Barefoot et al. |
| 2005/0145794 A1* | 7/2005 | Faubion .................. B60T 17/22 250/330 |
| 2006/0164230 A1* | 7/2006 | DeWind .................. B60K 35/00 340/461 |
| 2007/0040911 A1* | 2/2007 | Riley ..................... H04N 7/181 348/148 |
| 2012/0050025 A1* | 3/2012 | Hoeffel .................. B60Q 9/007 340/435 |
| 2013/0128048 A1* | 5/2013 | Okajima .................. B60R 1/00 348/148 |
| 2015/0049192 A1* | 2/2015 | Hooton .................. B60R 11/04 348/148 |
| 2015/0085116 A1* | 3/2015 | Graumann .............. B60R 1/025 348/148 |
| 2015/0145472 A1 | 5/2015 | Kees et al. |
| 2016/0101734 A1 | 4/2016 | Baek |
| 2018/0126910 A1* | 5/2018 | Herrmann ............... B60R 1/072 |

FOREIGN PATENT DOCUMENTS

| | | | |
|---|---|---|---|
| JP | 2001180239 A | 7/2001 | |
| JP | 2004255903 A | 9/2004 | |
| KR | 20110056049 | 5/2011 | |
| WO | WO-03016983 A1 * | 2/2003 | ......... G02B 26/0816 |

* cited by examiner

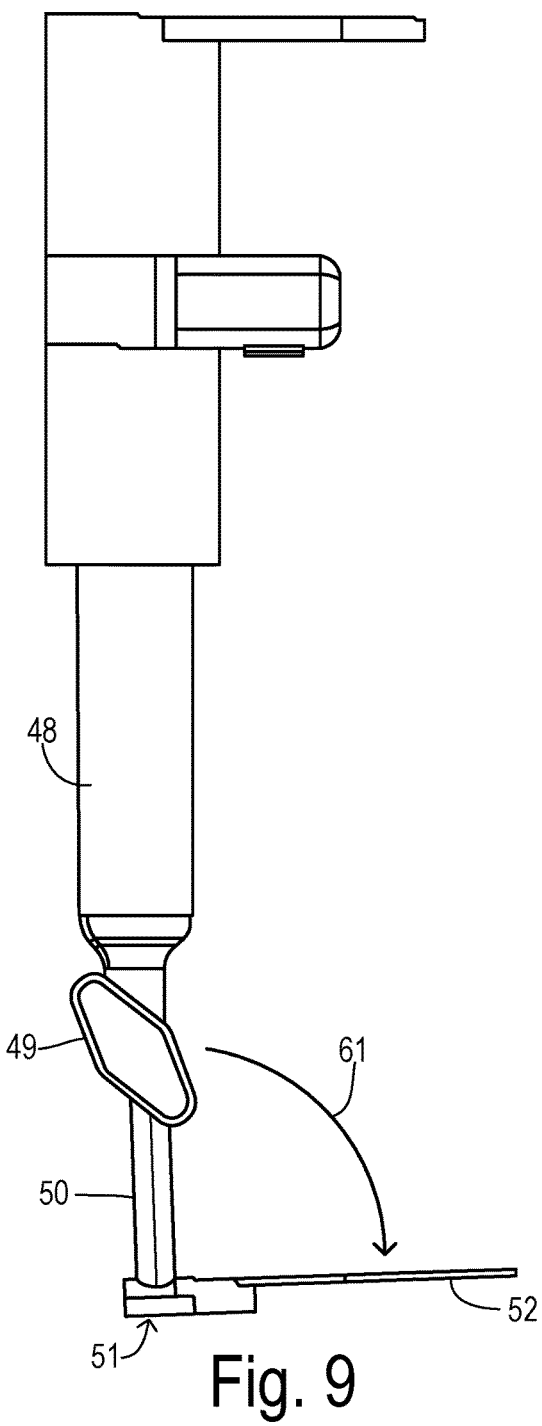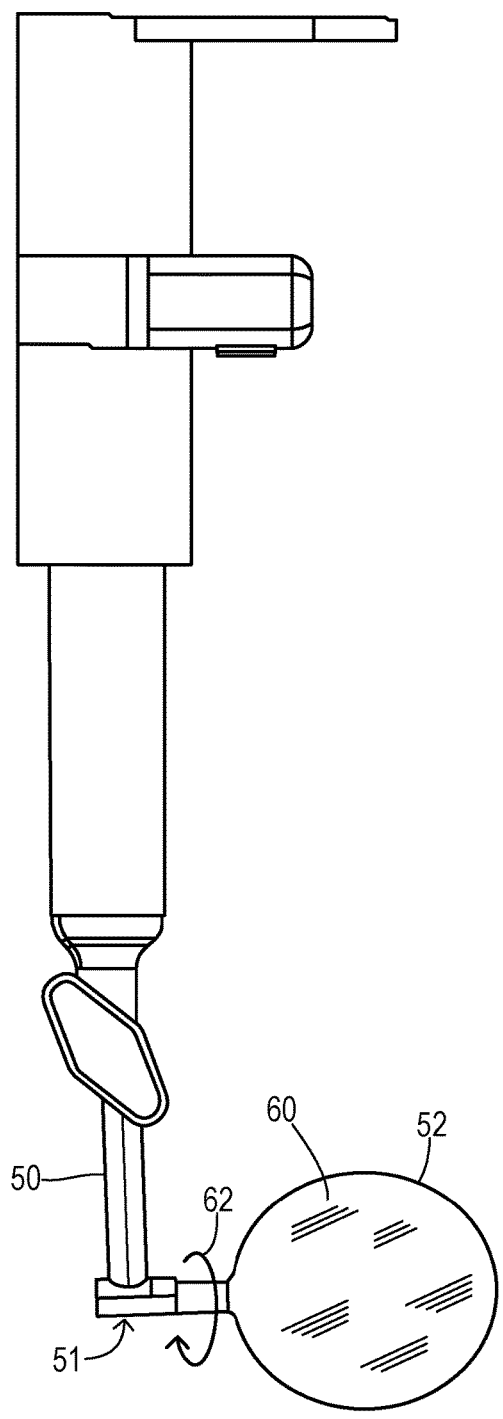
Fig. 9
Fig. 10

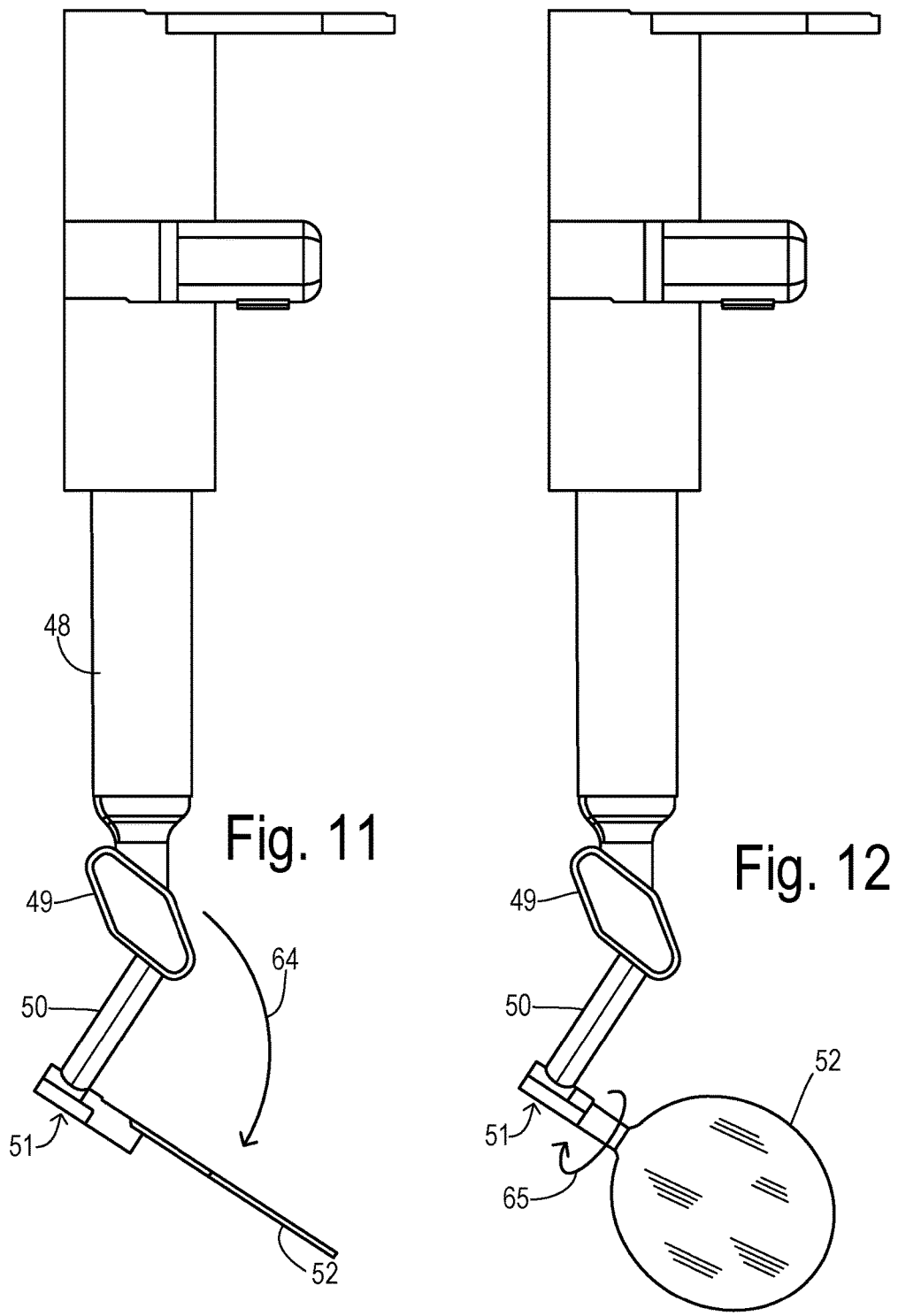

SHIELDED CAMERA MONITORING OF WHEELS FROM VEHICLE UNDERSIDE USING REFLECTORS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to monitoring/vision systems for motor vehicles, and, more specifically, to a camera system having a fixed image sensor and a movable reflective element for providing various fields of view beneath a vehicle while providing environmental shielding.

The use of vision and other remote sensing systems on vehicles, together with object detection, image processing, and driver assistance functionality, has increased rapidly in modern vehicle designs (e.g., in blind spot monitoring, lane detection, adaptive cruise control, impact warning, and others). In another example, parking assist systems and backup systems are known for providing images and/or warning signals to a driver to aid in the steering/alignment process and to avoid impacts with obstacles.

Image sensors and other remote sensors are typically mounted to a side surface (e.g., grille or hatchback) or roof structures where exposure to the road environment such as dirt, mud, and salt is manageable. A camera/image sensor is typically not mounted to an underside of the vehicle because of the difficulty of keeping a lens clear of debris. Without a view from the underside, however, these driver assist systems are less useful for avoiding contact of the wheels or lower fascia with adjacent objects (especially when a driver is starting from a stationary position). For better assistance during parking or other low speed maneuvers, it would be desirable to provide a better view of the vicinity of the wheels.

Prior attempts to utilize cameras providing a view beneath a vehicle include the use of retractable covers and telescoping camera mounts so that a camera can be deployed when needed and then stowed within a protected chamber during normal vehicle travel. The use of a movable camera, however, introduces additional costs and additional sources of potential device failures as compared with a fixed camera. In addition, since the camera lens is deployed into the challenging environment beneath the vehicle it is still subject to contamination with debris. Clearing the debris from a camera lens may be more difficult than from other, less sensitive surfaces.

SUMMARY OF THE INVENTION

The invention overcomes the foregoing disadvantages by using a fixed image sensor which remains in a protective housing while a reflective element (e.g., a mirror) is deployed from the protective housing on a carrier arm that can be manipulated to provide a desired, reflected view beneath the vehicle to the image sensor. Thus, a more robust and reliable image-guiding system is obtained since no complex electronics and no sensitive lens structures must protrude from the protective housing. Furthermore, the clearing of any built-up debris can more easily and safely be accomplished for a simple reflector element than from a movable camera lens.

Using the improved shielded imaging system which attaches to a fixed frame structure on an underside of the vehicle, it is possible to create a driver assist function that monitors the surroundings of the vehicle wheels and bumpers, projects a corresponding view to the driver on the vehicle instrument panel, and optionally conduct object detection and impact warning, if desired. The system can be automatically activated when the vehicle is being parked or moving at a slow speed.

In one aspect of the invention, an imaging system for a motor vehicle comprises a housing configured to attach to a fixed frame structure on an underside of the vehicle to form an enclosure with an open bottom. A fixed camera is mounted in the enclosure having a first field of view directed through the open bottom. A reflector is supported by a carrier mechanism. The carrier mechanism has a linear section and a rotary section. The linear section is extendable between a retracted position which stows the reflector inside the enclosure and an extended position which deploys the reflector through the open bottom. The rotary section rotates the reflector into an alignment with the camera to provide a reflected field of view along the underside of the vehicle. A controller is coupled to the carrier mechanism for selectably deploying the reflector through the open bottom for limited periods to capture images during predetermined conditions and otherwise retracting the reflector into the enclosure for shielding from an external environment.

BRIEF DESCRIPTION OF THE DRAWINGS

FIGS. 9 and 10 are side views of the imaging system showing successive steps in one embodiment for aiming a field of view into a desired direction.

FIG. 11 is a side view of the imaging system showing another rotational position for obtaining a desired field of view.

FIG. 12 is a side view of the imaging system of FIG. 11 with an additional axis of rotation that lies in the plane of the reflector.

DETAILED DESCRIPTION OF PREFERRED EMBODIMENTS

Figure 1:
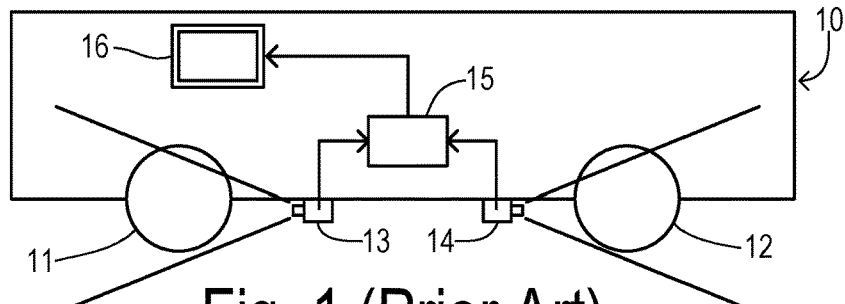
FIG. 1 is a diagram showing an under-vehicle monitoring system.

Referring to FIG. 1, a camera system for monitoring beneath a vehicle 10 includes cameras 13 and 14 with fields of view directed in the vicinity of wheels 11 and 12. Camera signals are coupled to an image processor 15 and a display 16 to present images to a driver of vehicle 10. Cameras used in conventional systems have been either stationary (with or without movable protective covers) or at the end of a movable arm that allows extension of the camera from a protective chamber. A movable camera can also be configured to allow panning of the camera's field of view. A fixed camera may be difficult to keep sufficiently clear of debris and may be subject to being easily damaged by impact with foreign objects when placing it low enough to obtain a useful field of view. On the other hand, a movable camera introduces a potential source of failures in that a moving interface between the camera electronics and a fixed wiring harness is required. Also, the addition of wiping or cleaning systems to clear debris from a camera lens may be challenging.

The present invention utilizes a fixed camera that remains within a protected (i.e., shielded) housing or chamber. To obtain the desired image fields, one or more reflecting elements (e.g., similar to a dental mirror) are selectably deployed beneath the fixed camera to give the camera a reflected field of view along the underside of the vehicle.

Figure 3:
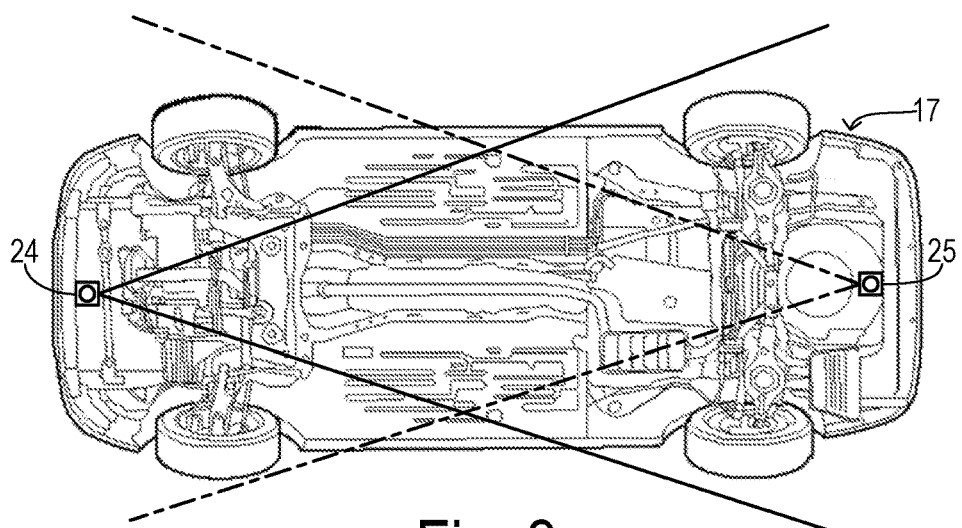
FIG. 3 is a bottom view of a motor vehicle having front and rear imaging systems installed to provide views along the underside of the vehicle, wherein each imaging system can provide a static view longitudinally along the vehicle.
Figure 4:
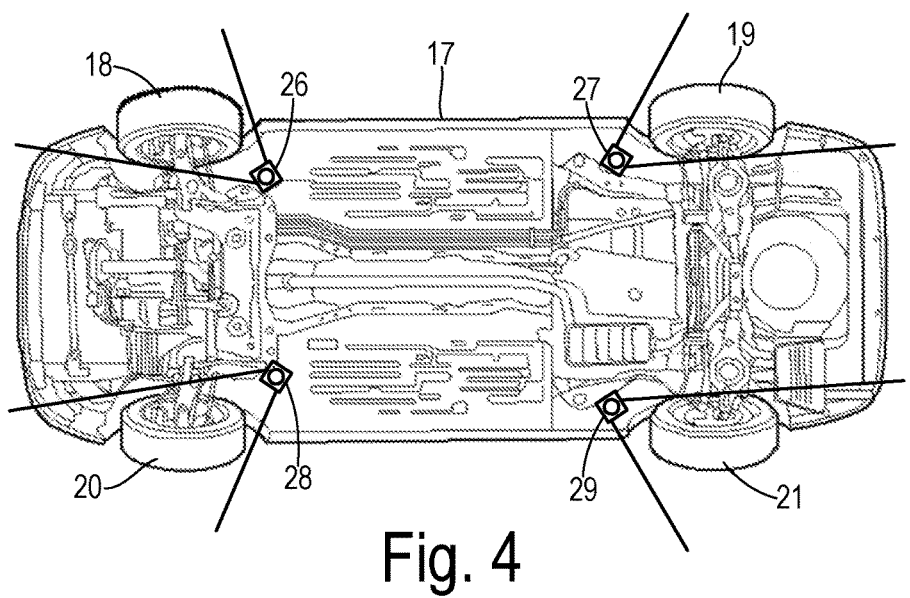
FIG. 4 is a bottom view of a motor vehicle having four separate imaging systems each installed to provide a view around a respective wheel.
Figure 2:
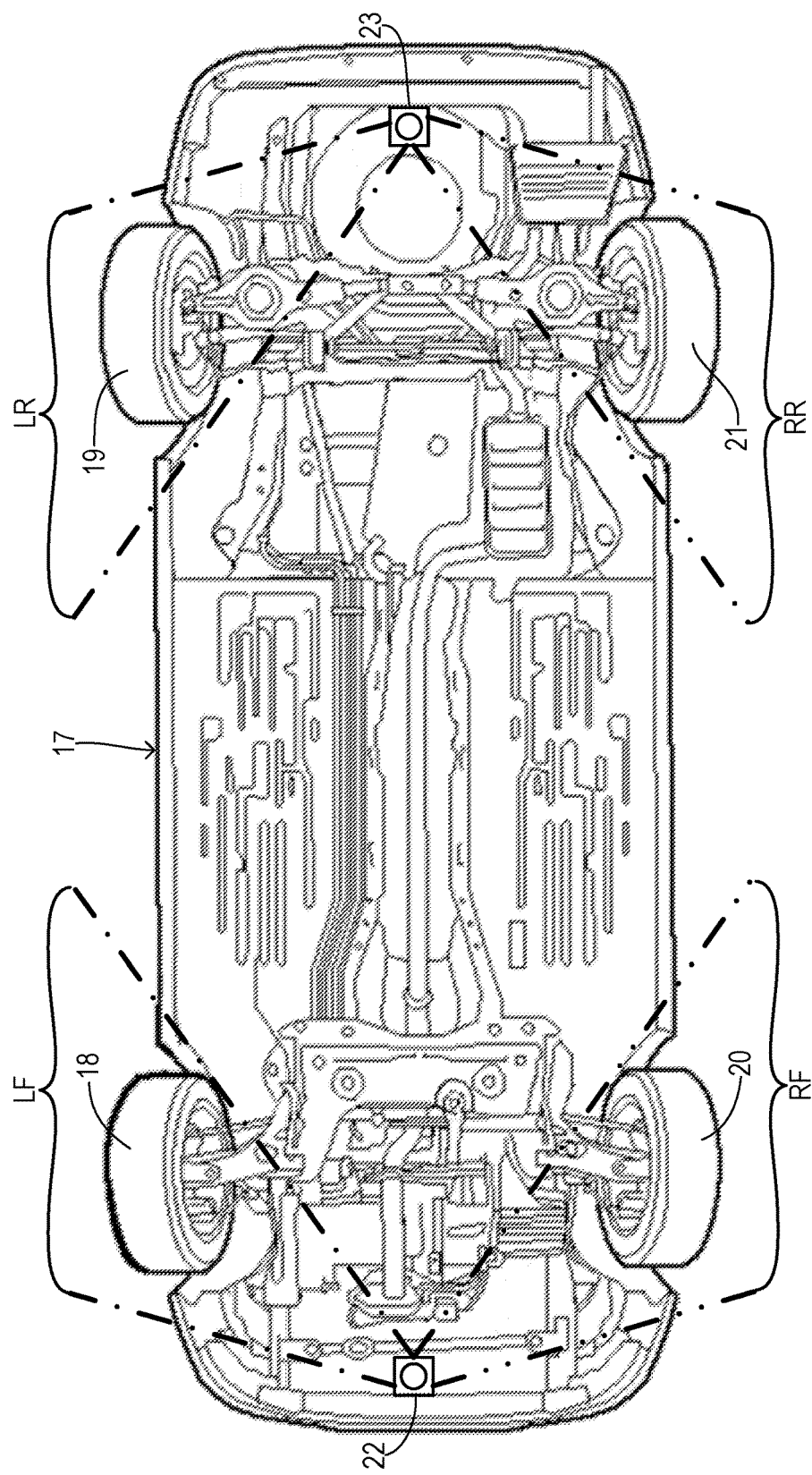
FIG. 2 is a bottom view of a motor vehicle having front and rear imaging systems installed to provide views along the underside of the vehicle, wherein each imaging system can be selectably directed toward different wheels.

Many different configurations of a driver-assist/underbody monitoring system can be obtained using various placements of one or more combined camera/reflector imaging systems on the underside of a vehicle. FIG. 2 shows a vehicle 17 having wheels 18-21, wherein a front imaging system 22 and a rear imaging system 23 are attached to any convenient fixed frame structure of vehicle 17 (e.g., a frame rail). Even though each camera is fixed, the associated reflector may be adjustable so that the reflected field of view can be panned toward different viewing areas. For example, imaging system 22 can be panned from a configuration for imaging wheel 18 in a field of view LF to another configuration for imaging wheel 20 in a field of view RF. A simpler mechanism for deploying a reflector can be obtained by limiting an imaging system to providing one fixed field of view in the deployed state. FIG. 3 shows an example wherein vehicle 17 has a front imaging system 24 which deploys a reflector to provide a rearward field of view capturing the rear wheels and a rear imaging system 25 which deploys a reflector to provide a forward field of view capturing the front wheels. In another embodiment, FIG. 4 shows vehicle 17 with four separate imaging systems 26-29 each providing a reflected field of view toward a corresponding wheel 18-21. Many other configurations can take advantage of appropriate mounting locations and desired views for enabling various drives assistance functions.

Figure 5:
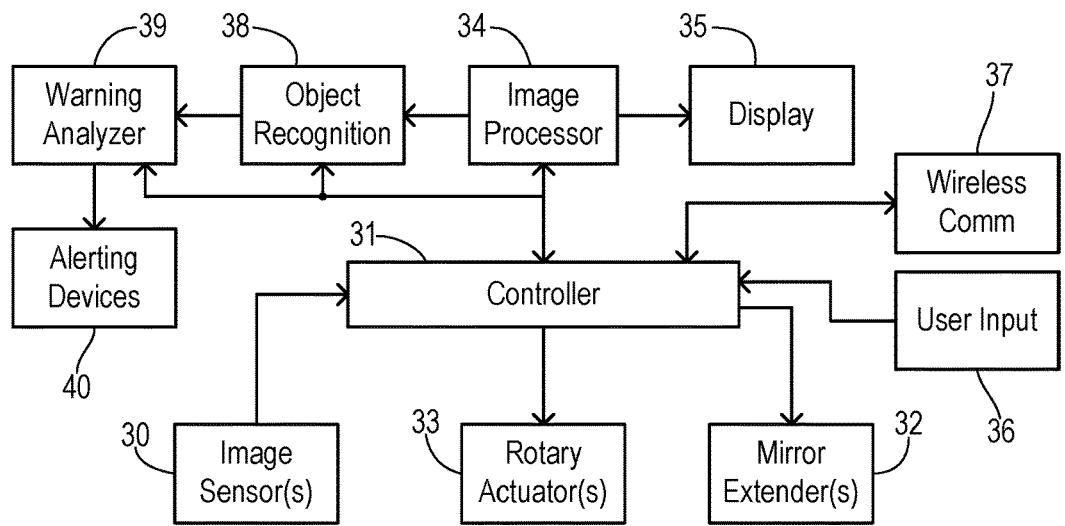
FIG. 5 is a block diagram showing an electrical architecture of a driver assist system using imaging systems of the present invention.

FIG. 5 shows a typical driver assist system incorporating an under-vehicle imaging system of the present invention wherein one or more image sensors 30 provide image data of one or more desired fields of view to a controller 31. In order to deploy each one of image sensors 30 into a position for providing a desired view along an underside of the vehicle, controller 31 is connected to mirror extenders 32 and rotary actuators 33 described in greater detail below. Image data obtained from image sensors 30 is provided from controller 31 to an image processor 34 which delivers a resulting video image to a display 35 located in the vehicle for viewing by a driver. Activation of the imaging system(s) and directing the field(s) of view to the appropriate wheel(s) can be controlled automatically by controller 31 or can be performed in response to user commands via a user input 36 (e.g., touch switches on a control panel mounted for access by the driver). The imaging system could also be controlled via a wireless communication block 37, such as a Bluetooth link to a smart phone having a control application configured to provide user input and/or to receive image data or warning messages.

Examples of predetermined conditions for automatic activation of the imaging systems include a parking condition (i.e., when maneuvering close to a curb or other difficult-to-see objects), a reverse gear condition (i.e., backing up), or a low-speed condition (i.e., during any low-speed maneuvers wherein impact dangers to an deployed imaging system is unlikely).

Whether manually or automatically activated, images obtained from the imaging systems can be used for monitoring for potential impacts and warn the driver accordingly. Thus, images from image processor 34 may be coupled to an object recognition block 38, with the resulting object information provided to warning analyzer 39 which tracks the relative position of objects with respect to the vehicle wheels in order to predict potential impacts. When a potential impact is detected, analyzer 39 activates alerting devices 40, such as a speaker for generating a warning tone or turning on a visual icon on display 35.

Figure 6:
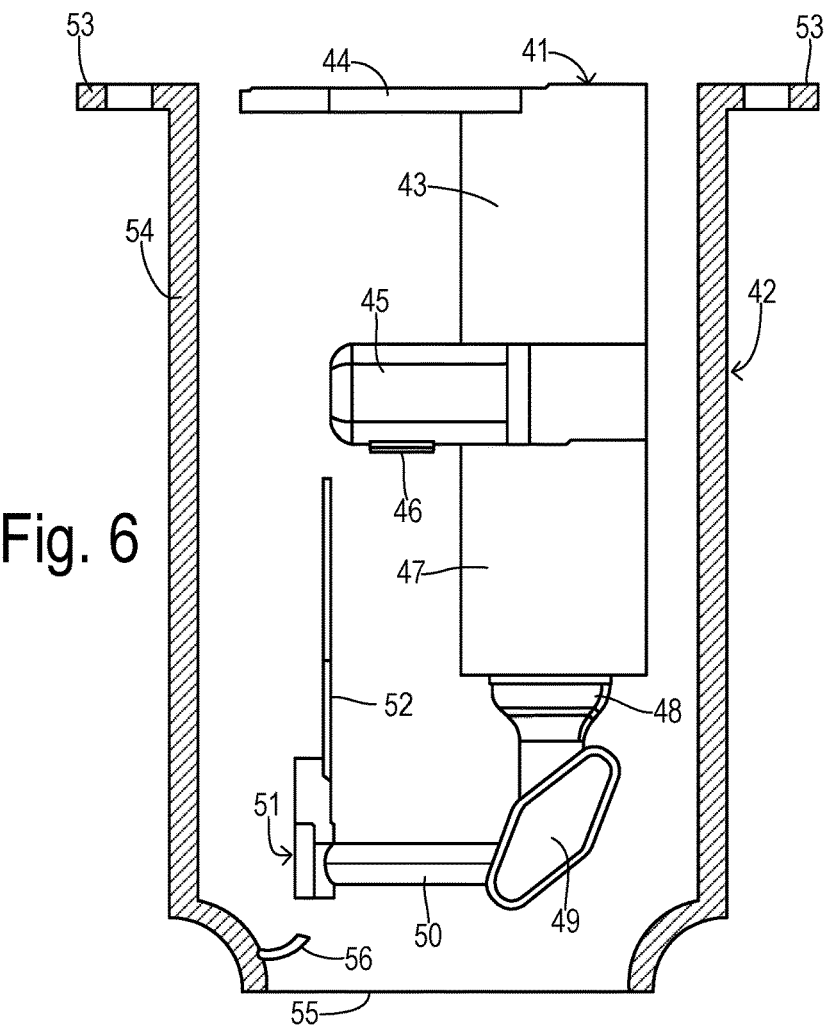
FIG. 6 is a side view showing an imaging system with a carrier mechanism retracted into a protective housing and a reflector in a stowed condition.

A preferred imaging system of the invention is shown in FIG. 6 wherein an image capture system 41 is mounted within and shielded by a housing 42. Image capture system 41 includes a main cylindrical body 43 and a mounting plate 44 which attaches image capture system 41 to a fixed frame structure of a vehicle. Housing 42 may fully encompass all the sides of imaging capture system 41, or a portion of the perimeter may be comprised an opening or window which fits against a vertical portion of the fixed frame structure to complete a continuous shielding surface around the periphery. Housing 42 includes a mounting flange 53 for attaching housing 42 to the same fixed frame structure. Image capture system 41 is thus retained within a protective chamber which is accessible only via an open bottom 55. If desired, open bottom 55 could be selectively opened and closed by a movable cover (not shown).

Image capture system 41 has a fixed camera 45 with a lens 46 mounted in a downward orientation for providing a first field of view directed through open bottom 55. Camera 45 and lens 46 remain stationary within housing 42 and remain shielded from the external environment. In order to provide a desired field of view along the underside of the vehicle, a reflector 52 (such as a mirror) is supported by a carrier mechanism to deploy reflector 52. The carrier mechanism includes i) a linear section having a base 47 and a telescoping arm 48, and ii) a rotary section having a pivot base 49, linking shaft 50, and a reflector base 51. A sidewall 54 of housing 42 may include a debris remover 56 such as a wiper blade positioned to clean the reflector when it passes through open bottom 55. Debris remover 56 could also be comprised of a cleaning nozzle for directing a spray of compressed air, a liquid (e.g., from a source of windshield washer fluid), and/or a mixture of air and liquid. Debris remover 56 could be mounted to either housing 42 or body 43 of image capture system 41.

Figure 7:
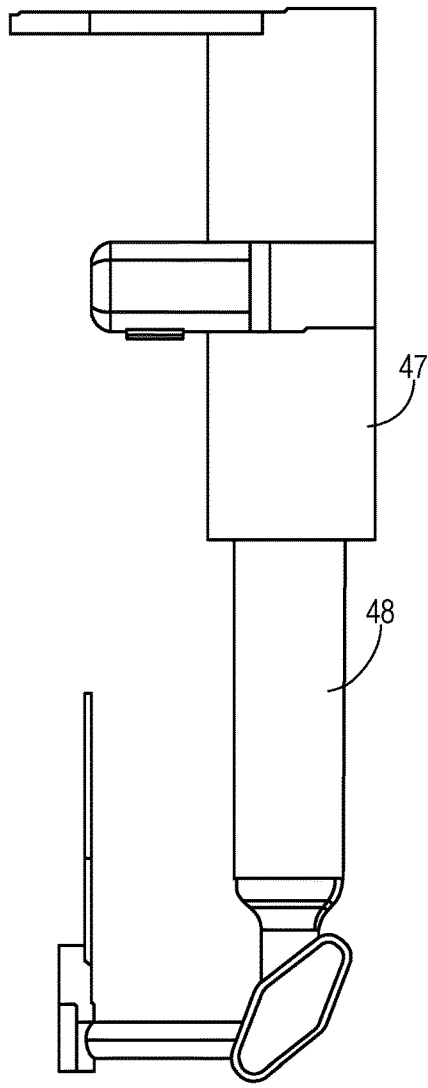
FIG. 7 is a side view of the imaging system of claim 6 with the carrier mechanism extended.
Figure 8:
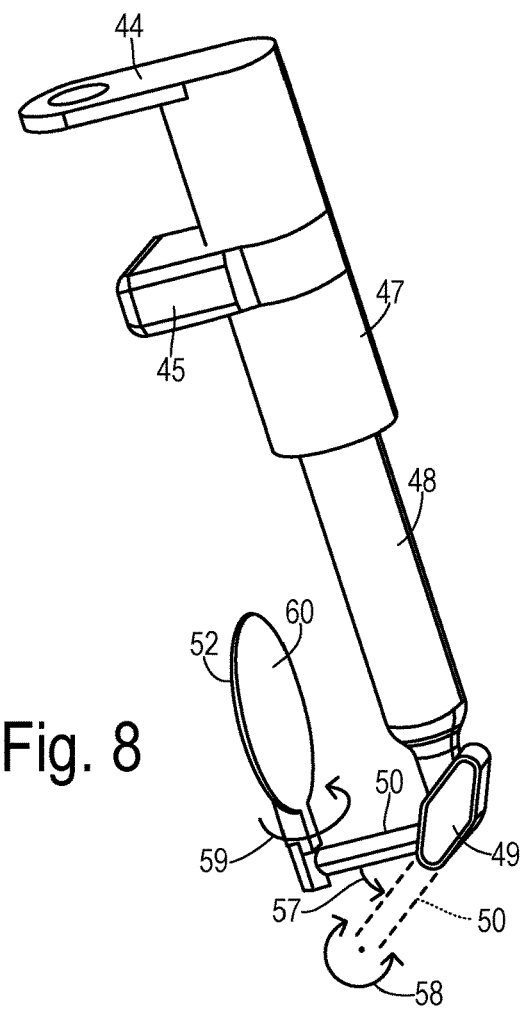
FIG. 8 is a perspective view of the imaging system in the extended position, showing various rotational joints that can be used to aim a desired field of view that is seen in the reflector.

In FIG. 6, reflector 52 is shown in a retracted position (i.e., stowed inside housing 42). In the stowing orientation, reflector 52 provides a minimum profile for passing through open bottom 55. By activating the linear section of the carrier mechanism, telescoping arm 48 moves downward as shown in FIG. 7 so that the reflector deploys to an extended position through the open bottom. Once clear of housing 42, the rotary section is activated to rotate the reflector into in a desired alignment with fixed camera lens 46 to achieve a reflected field of view along the underside of the vehicle. FIG. 8 shows a mirrored surface 60 of reflector 52 and various axes of rotation that can be built into the rotary section in order to aim the reflected field of view toward a selected wheel of the vehicle. Thus, pivot base 49 is multi-axial with a first rotational direction 57 within a vertical plane and a second rotational axis along a longitudinal axis of linking shaft 50 as shown by arrow 58. In addition, reflector base 51 may include a rotary actuator for providing rotation of reflector 52 around its longitudinal axis as shown by arrow 59. Various servo mechanisms are known in the art for achieving these and other degrees of freedom for rotating a reflector into almost any arbitrary orientation with respect to the fixed camera.

FIGS. 9 and 10 show one simplified embodiment for deploying a reflector requiring only two rotational axes. After deployment from the housing into an extended position by sliding telescoping arm 48 to its maximum downward extent, the next step of deployment as shown in FIG. 9 involves rotating linking shaft 50 within pivot base 49 along an arc 61 so that a reflective surface of reflector 52 is in the field of view of the fixes camera. Then reflector base 51 rotates reflector 52 around an axis 62 as shown in FIG. 10 causing a reflected field of view to extend sideways. Other views can be obtained as shown in FIGS. 11 and 12 by rotating linking shaft 50 over a larger arc 64 and then rotating reflector 52 around its axis as shown at 65.

Figure 13:
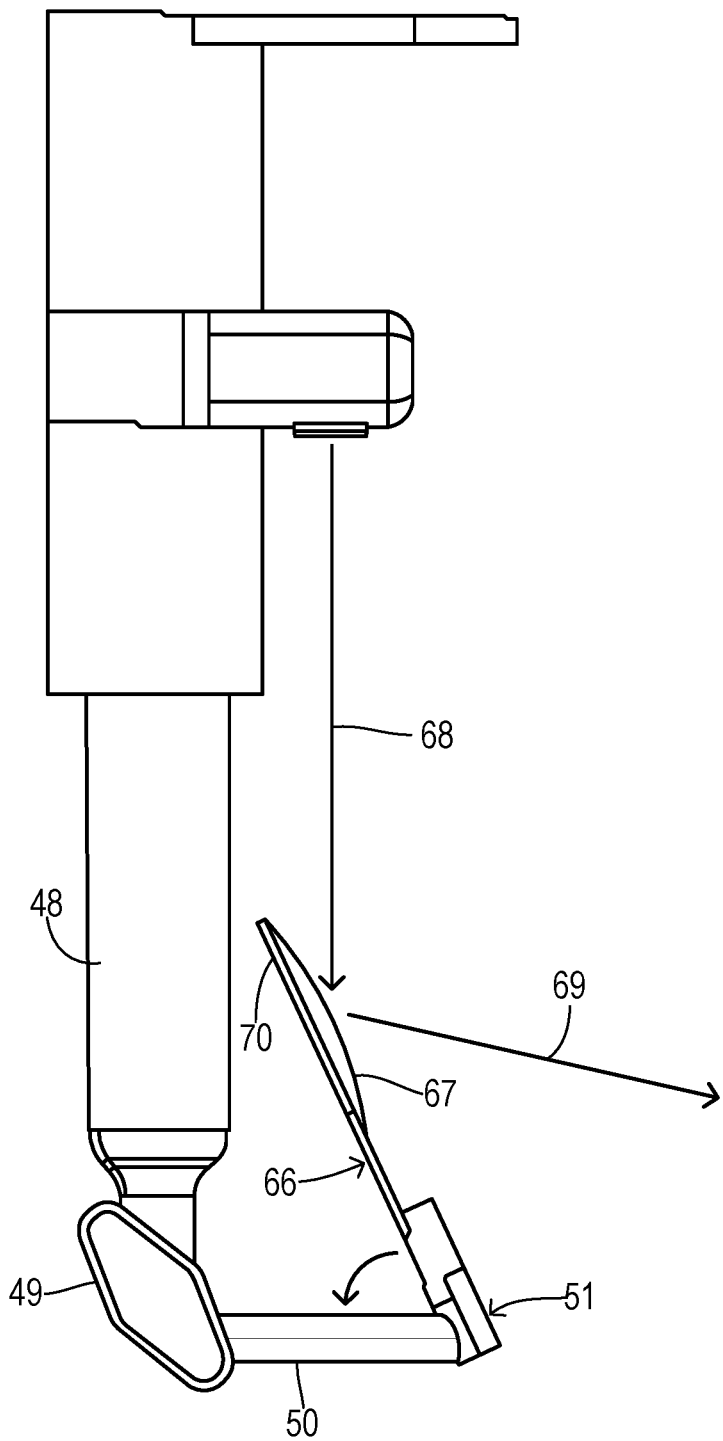
FIG. 13 is a side view of another embodiment of an imaging system, wherein the reflector has an elliptical surface.

Another embodiment is shown in FIG. 13 wherein reflector base 51 is provided with a capability to rotate in a vertical plane in order to place a reflector 66 with a mirrored surface 67 into a first field of view 68 of the fixed camera in order to provide a reflected field of view 69 toward a selected wheel of the vehicle. Surface 67 may have a convex shape to provide an expanded (i.e., fisheye) view of a selected area. Furthermore, reflector can be double-sided with another mirrored surface 70 to provide different viewing orientations and/or magnifications.

Figure 14:
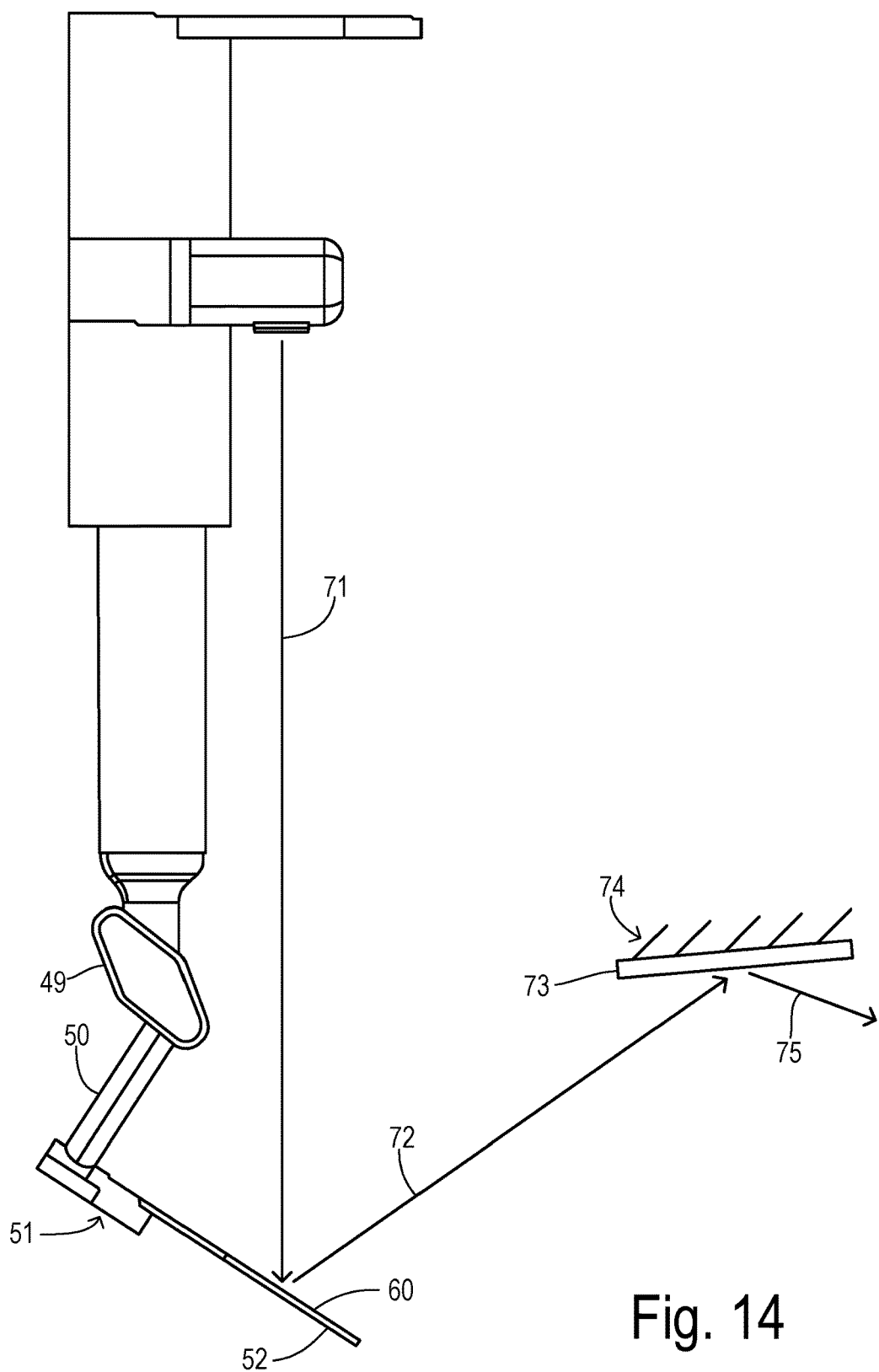
FIG. 14 is a side view of another embodiment of an imaging system, wherein a plurality of reflectors provide a compound image path.

Another embodiment shown in FIG. 14 provides access to addition viewing angles by using a plurality of reflective surfaces. A first field of view 71 is directed vertically downward from the fixed camera and reflects from mirrored surface 60 to follow a line 72 to a remote secondary mirror 73 which is fixedly mounted to a fixed frame structure 74. A final reflected field of view 75 results from a compound image path, thereby obtaining viewing perspectives not otherwise available from the location of first reflector 52.

Figure 15:
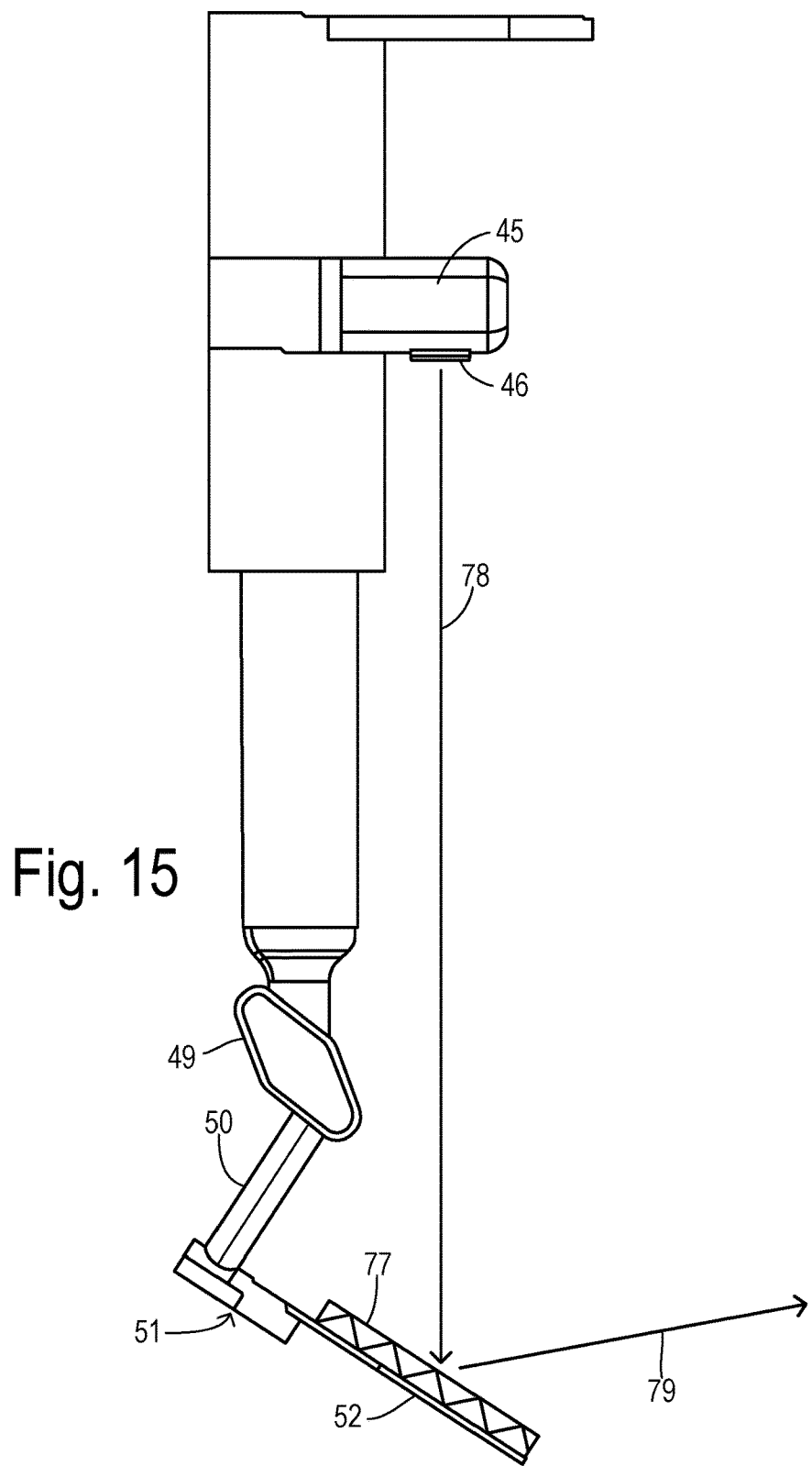
FIG. 15 is a side view of another embodiment of an imaging system employing a prism.

In another embodiment shown in FIG. 15, reflector 52 is comprised of a reflective prism 77 for providing the reflected field of view using beam steering. Thus, a first field of view 78 is steered to a reflected field of view 79. Prism 77 may include compound elements and/or multiple internal reflections to steer the field of view according to a range of angles.

Figure 16:
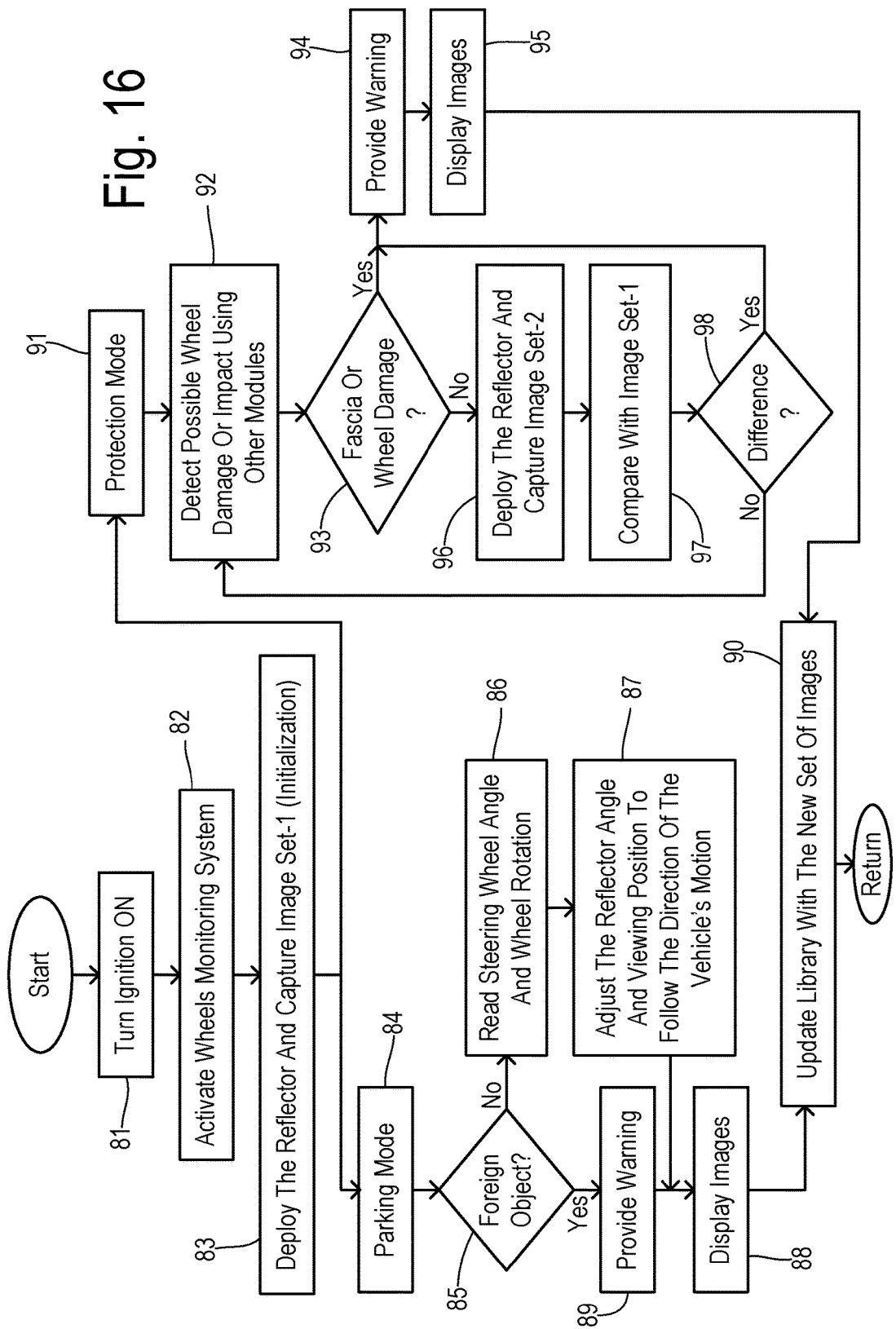
FIG. 16 is a flowchart showing one preferred embodiment of a method of the invention.

One embodiment of a method for providing various driver assist functions using the under-vehicle monitoring system of the invention is shown in FIG. 16. The method starts with the turning ON of the ignition in step 81. A wheel monitoring system utilizing the under-vehicle imaging systems is activated in step 82. In step 83 the reflector(s) are deployed and a first image set (i.e., initialization image set) is captured. After step 83, FIG. 16 shows to independently operated driver assist modes including a parking mode 84 and a protection mode 91. Parking mode 84 is active during parking conditions, and protection mode 91 can be automatically activated throughout vehicle use as described below.

Parking mode 84 is conducted as a loop which is executed periodically during parking of a vehicle. The onset of a parking mode can be automatically determined by a specific driver input or automatically in response to the vehicle speed being below a threshold together with changes in the steering wheel angle greater than a threshold angle, for example. In step 85, a check is performed to determine whether a foreign object is in the vicinity of a wheel or in the path of a wheel. During the first entry into parking mode 84, no foreign object would be present or detected. When no object is being detected, the method proceeds to step 86 for reading a steering wheel angle and a wheel rotation direction in order to identify a current trajectory of the vehicle. In step 87, a reflector angle for each relevant imaging system is adjusted so that a reflected field of viewing is directed at the direction of vehicle motion. In step 88, captured images may be displayed to the driver in order to assist in navigating obstacles in or near the vehicle's path during parking mode. In step 80, a library of stored images (e.g., in the controller memory) may be updated with newly captured images for use in accident reconstruction, wheel monitoring in protection mode 91, or for other purposes before returning to step 84 in order to continue processing in the parking mode. If a foreign object is detected in the vehicle's path in step 85, then a driver warning may be generated in step 89. Once the vehicle is no longer in a parking mode (e.g., vehicle speed has risen above a threshold), then operation may continue in protection mode 91.

During protection mode 91, other vehicle monitoring systems such as a restraint control module or body control module monitor various vehicle parameters in step 92 in order to detect possible wheel damage or impacts. For example, crash sensors for controlling airbag deployment or accelerometers for traction control systems may indicate severe events which may be associated with underbody damage. In step 93, a check is performed to determine whether the indicated damage may involve a wheel or the vehicle facia. If so, then a warning is generated in step 94 and relevant underbody images are captured and displayed in step 95. These images may again be stored in an image library in step 90.

In step 93, if the analysis from other systems indicating possible impacts does not specifically identify potential damage to the wheels or fascia, then the imaging systems may be deployed in step 96 to visually check for such damage by extending their the reflectors and capturing a second image set. In step 97, the newly captured, second image set is compared with the initialization image set. In step 98, a check is performed to determine whether significant differences exist between the compared images which would correspond to changes in the wheel or fascia structures that may indicate impact damage. If there are no such differences, then a return is made to step 92, otherwise the method proceeds to provide a warning in step 94.

What is claimed is:

1. An imaging system for a motor vehicle, comprising:
   a housing configured to attach to a fixed frame structure on an underside of the vehicle to form an enclosure with an open bottom;
   a fixed camera mounted in the enclosure having a first field of view directed vertically downward through the open bottom;
   a reflector;
   a carrier mechanism supporting the reflector having a linear section and a rotary section, wherein the linear section is extendable between a retracted position which stows the reflector inside the enclosure and an extended position which deploys the reflector through the open bottom, and wherein the rotary section rotates the reflector into an alignment with the fixed camera to provide a reflected field of view along the underside of the vehicle to monitor surroundings of the vehicle while the fixed camera remains inside the enclosure; and
   a controller coupled to the carrier mechanism for selectably deploying the reflector through the open bottom for limited periods to capture images during predetermined conditions and otherwise retracting the reflector into the enclosure for shielding from an external environment.

2. The system of claim 1 wherein the reflector is comprised of a convex mirror.

3. The system of claim 1 wherein the reflector is comprised of a two-sided mirror.

4. The system of claim 1 wherein the rotary section provides multi-axis rotation to aim the reflected field of view toward a selected wheel of the vehicle.

5. The system of claim 1 wherein the rotary section includes two rotary joints spaced by an intermediate shaft.

6. The system of claim 1 wherein the rotary section is rotatable to a stowing orientation to provide a minimum profile for passing through the open bottom.

7. The system of claim 6 further comprising a debris remover proximate the open bottom for cleaning the reflector when passing through the open bottom.

8. The system of claim 1 further comprising a remote reflector configured to attach to the frame structure in alignment with a predetermined reflected field of view to provide a compound image path.

9. The system of claim 1 wherein the predetermined conditions include a manual request initiated by an occupant in the vehicle.

10. The system of claim 1 wherein the predetermined conditions include an automatically-detected parking condition, a reverse-gear condition, and an automatically-detected low-speed threshold condition.

11. The system of claim 1 wherein the predetermined conditions include a fault checking condition.

12. The system of claim 1 further comprising a vehicle-mounted display for presenting the captured images to an occupant of the vehicle.

13. Vehicle apparatus comprising:
    a frame structure defining an underside of the vehicle;
    a plurality of wheels coupled to the frame structure;
    a housing attached to the frame structure forming an enclosure with an open bottom;
    a fixed camera mounted in the enclosure having a first field of view directed vertically downward through the open bottom;
    a reflector;
    a carrier mechanism supporting the reflector having a linear section and a rotary section, wherein the linear section is extendable between a retracted position which stows the reflector inside the enclosure and an extended position which deploys the reflector through the open bottom, and wherein the rotary section rotates the reflector into an alignment with the fixed camera to provide a reflected field of view along the underside of the vehicle toward at least one of the wheels to monitor surroundings of the vehicle while the fixed camera remains inside the enclosure; and
    a controller coupled to the carrier mechanism for selectably deploying the reflector through the open bottom for limited periods to capture images during predetermined conditions and otherwise retracting the reflector into the enclosure for shielding from an external environment.

14. The apparatus of claim 13 wherein the reflector is comprised of a convex mirror.

15. The apparatus of claim 13 wherein the rotary section provides multi-axis rotation to aim the reflected field of view toward a selected wheel of the vehicle and to rotate the reflector to a stowing orientation to provide a minimum profile for passing through the open bottom.

16. The apparatus of claim 13 the predetermined conditions include a manual request initiated by an occupant in the vehicle.

17. The apparatus of claim 13 wherein the predetermined conditions include an automatically-detected parking condition, a reverse-gear condition, and an automatically-detected low-speed threshold condition.

18. The apparatus of claim 13 wherein the predetermined conditions include a fault checking condition.

19. The apparatus of claim 13 further comprising a vehicle-mounted display for presenting the captured images to an occupant of the vehicle.

* * * * *